Dec. 31, 1935.   R. S. TROTT   2,026,446
EXHAUST LINE MOUNTING
Filed Nov. 30, 1931
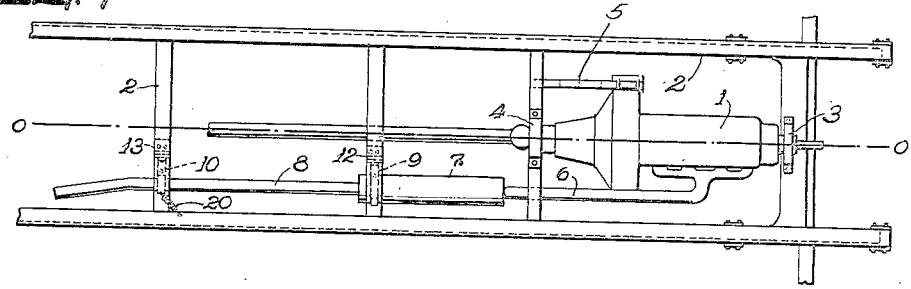
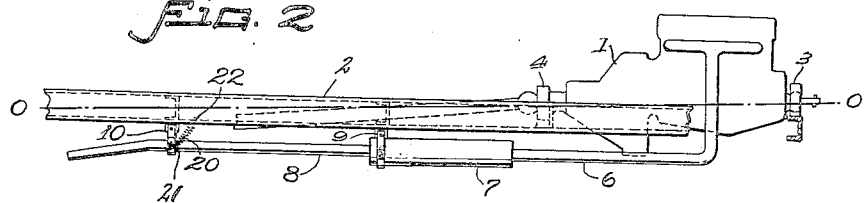
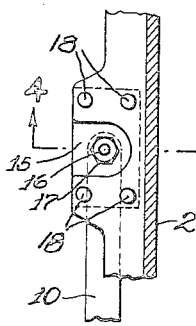
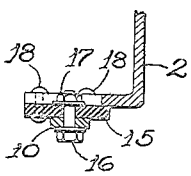
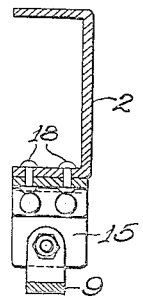
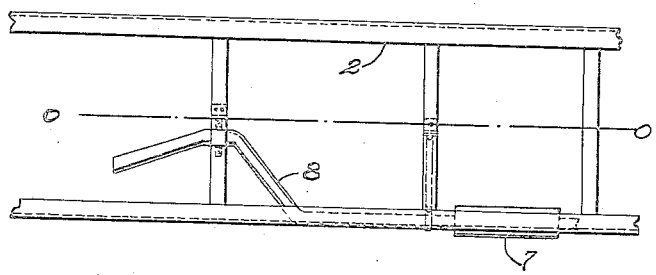
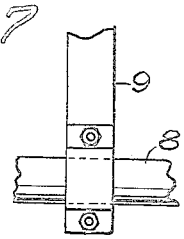
Inventor
Rolland S. Trott
Vernon E. Hodges
his Attorney Patented Dec. 31, 1935

2,026,446

UNITED STATES PATENT OFFICE 2,026,446

EXHAUST LINE MOUNTING

Rolland S. Trott, Denver, Colo.

Application November 30, 1931, Serial No. 578,114

15 Claims. (Cl. 180—64)

This invention relates to mountings for muffler and exhaust pipes of motor vehicles, and more especially to such mountings to be used with engine units that are mounted to have movement with respect to the frame of the vehicle about a longitudinal axis of oscillation.

In motor vehicles having engine units mounted to oscillate about a longitudinal axis of oscillation, much trouble has been experienced with the exhaust pipe and muffler and their mountings. The continual torque cushioning movements of the engine unit exert a strain upon the exhaust pipe and muffler causing not only noise but breakage.

It is the object of this invention, therefore, to provide mounting means for the exhaust pipe and muffler of automobiles which will operate properly with engines mounted to have torque and force cushioning movements about a longitudinal axis of oscillation.

It is a further object of this invention to provide such mounting means for exhaust pipes and mufflers which will not become noisy and which will not cause breakage due to strain incident to the movable mounting of the engine unit.

I accomplish these objects by providing mounting means to be securely attached to the exhaust pipe or muffler, and by providing movable mounting means for the first mounting means upon the frame of the vehicle substantially coincident with or adjacent the extended axis of oscillation of the engine unit with respect to the frame of the vehicle.

All of this is fully described below and is illustrated in the drawing, in which:—

Figure 1 is a plan view showing a portion of a motor vehicle, the axis of oscillation of the engine unit thereof, and also showing the exhaust pipe and muffler and the mounting means therefor.

Figure 2 is a side elevation of Figure 1.

Figure 3 is a detail horizontal section partly in elevation showing one form of connection between the mounting means and the frame of the vehicle.

Figure 4 is a section taken on the line 4—4 of Figure 3.

Figure 5 is a detail section of another form of connection between the mounting means and the frame of the vehicle.

Figure 6 is a plan view of a modified form of exhaust pipe muffler, and mounting means.

Figure 7 is a detail plan view of a modification showing a connection between a bracket and the exhaust pipe.

In Figure 1, the engine unit 1 is mounted to have resiliently opposed pivotal movement with respect to the frame 2 by means of the front mounting 3, the rear mounting 4 and the stabilizer 5, or by any other proper means or construction. The resulting pivotal or oscillating movement provided is about the axis of oscillation 0—0.

My present invention, however, is applicable to any other construction of mounting or stabilizer, by which the engine unit may have an oscillating or orbital movement with respect to the frame about a longitudinal axis of oscillation.

The exhaust pipe 6 is attached to the engine unit 1 in any usual or proper manner, and the complete exhaust line includes the muffler 7 and the tail pipe 8.

The brackets 9 and 10 are securely clamped to the muffler 7 and pipe 8 respectively. Any other method, type, or construction of the brackets and the attachment to any of the members of the exhaust line may be used so long as the result is a firm and tight connection.

The brackets 9 and 10 are in turn movably mounted upon the frame 2 by the mountings 12 and 13 respectively, these mountings being located adjacent or as close as is practical to the extension of the axis of oscillation 0—0 of the engine unit 1.

The mountings 12 and 13 are composed of flexible metallic, or non-metallic members 15 which are bolted to the brackets by the bolts 16 and nuts 17, and to the frame 2 by the rivets 18.

As the engine unit 1 oscillates about the axis 0—0 the mountings 12 and 13 will permit the exhaust line also to oscillate substantially about the same axis 0—0 and hence there will be no resulting strains in the exhaust line, and no noise or wear in the mountings.

In the construction shown in Figure 6, the tail pipe is bent inward toward the axis of oscillation 0—0 and the flexible member 15 may be attached to the tail pipe 8 and to the frame 2.

Though more than one exhaust line mounting is shown all but one may be eliminated if desired provided the mounting and the exhaust line are constructed to safely stand the resulting strains and stresses; or if desired, more mountings than are shown may be employed so long as they are mounted movably on the frame adjacent the axis 0—0.

In any case, the result is the same in that the exhaust line may, by my mounting oscillate about the same axis of oscillations as the engine unit 1 and thereby receive no strain. The spring 20, if desired, may be attached to the exhaust line as at 21 and to the frame as at 22, and will thereby help to sustain the weight of the exhaust line. In Figure 7, the bracket 9 is shown attached directly to the exhaust pipe 8 instead of to the muffler 7.

Having now described my invention, what I claim as new and desire to protect by Letters Patent is as follows:

1. In a motor vehicle having a frame, the combination of an engine unit mounted at its opposite ends on the frame to oscillate with respect thereto about an axis of oscillation extending longitudinally of the engine unit, an exhaust line fixed to the engine unit, and means other than the engine unit mounting means movably supporting the exhaust line on the frame of the vehicle approximately coincident with the axis of oscillation.

2. In a motor vehicle having a frame, the combination of an engine unit mounted on the frame for oscillation with respect to the frame about a longitudinal axis, discharge means fixed to the engine unit to receive the discharge gases therefrom, and means other than the engine unit mounting means movably supporting said discharge means on the frame adjacent the axis of oscillation.

3. In an automotive vehicle having a frame and an engine unit extending longitudinally in the vehicle and located approximately in the longitudinal central vertical plane thereof, means mounting the engine unit in the vehicle for movement with respect to the frame, exhaust pipe means extending longitudinally of the vehicle from the engine unit, and flexible supporting means other than the engine mounting means connected to the exhaust pipe means and connected to the frame at a point adjacent the longitudinal central vertical plane of the vehicle for supporting the exhaust pipe means and permitting movement of the exhaust pipe means in unison with the engine unit.

4. In an automotive vehicle having a frame and an engine unit extending longitudinally thereof, means mounting the engine unit in the vehicle for movement with respect to the frame, exhaust pipe means for the engine unit extending longitudinally of the vehicle and spaced laterally a substantial distance from the longitudinal, central vertical plane of the vehicle, and flexible means other than the engine mounting means connected to the exhaust pipe means and to the frame and extending inwardly from the exhaust pipe means toward the longitudinal central vertical plane of the vehicle for supporting the exhaust pipe means on the frame for movement relative thereto in substantial unison with the engine unit.

5. In an automotive vehicle having a frame and an engine unit mounted in the vehicle to oscillate about a longitudinal axis relative to the frame and having exhaust pipe means extending longitudinally of the vehicle in spaced relation from said axis, and flexible means other than the engine mounting connected to the exhaust pipe means and extending laterally therefrom toward said axis of oscillation and connected to the frame at a point spaced inwardly from the major portion of the exhaust pipe means, whereby the exhaust pipe means and the engine unit move relative to the frame in substantial unison.

6. In an automotive vehicle having a frame, the combination with an engine unit mounted in the vehicle to oscillate relative to the frame and having longitudinally extending exhaust pipe means, of flexible means other than the engine mounting and connected to the exhaust pipe means and to the frame for mounting the exhaust pipe means on the vehicle and permitting at least a portion of the exhaust pipe means to swing in an arc, the center of which is disposed laterally from a portion of the exhaust pipe means toward the longitudinal central vertical plane of the engine unit.

7. In a motor vehicle having a frame, an engine unit, means mounting the engine unit in the vehicle to oscillate with respect to the frame, an exhaust pipe line extending from the engine unit, and flexible means other than the first-mentioned mounting means and connected to the exhaust pipe line and to the frame for mounting the exhaust pipe line on the frame and permitting a substantial portion of the exhaust pipe line freedom to move with the oscillation of the engine on an arc the center of which is spaced laterally inward from a substantial portion of the exhaust pipe line.

8. In a motor vehicle, the combination of a frame, an engine unit, means mounting the engine unit on the frame for bodily oscillatory movement about a longitudinal axis, an exhaust line connected with the engine unit for oscillation therewith, and flexible means other than the engine mounting means for supporting the exhaust line on the frame adjacent the axis of oscillation of the engine unit for oscillation of the exhaust line about a center adjacent the axis of oscillation of the engine unit.

9. In a motor vehicle, the combination of a frame, an engine unit, means mounting the engine unit on the vehicle for bodily oscillatory movement about a longitudinal axis, an exhaust line having a fixed connection with the engine unit, and flexible supporting means other than the engine unit mounting means carried by the frame adjacent the axis of oscillation and supporting the exhaust line and permitting oscillation of the exhaust line with the engine unit without substantial deviation therebetween.

10. In a motor vehicle having a frame and an engine unit having a crankshaft and mounted on the vehicle to oscillate with respect to the frame about a longitudinal axis of oscillation extending approximately parallel with the engine crankshaft, an exhaust line connected to the engine unit, and means movably supporting the exhaust line on the frame of the vehicle substantially coincident with said axis.

11. In a motor vehicle having a frame and an engine unit having a crankshaft and mounted on the vehicle to oscillate with respect to the frame about a longitudinal axis of oscillation extending approximately parallel with the engine crankshaft, discharge means fixed to the engine unit to receive the discharge gases therefrom, and means movably supporting said discharge means on the frame of the vehicle adjacent said axis.

12. In a motor vehicle having a frame, the combination with an engine unit mounted on the frame of the vehicle for oscillation about a longitudinal axis, and an exhaust line fixed to the engine unit, of means other than the engine mounting means for mounting the exhaust line on the frame for oscillatory movement with the engine unit relative to the frame about an axis approximately coincident with the axis of oscillation of the engine unit.

13. In a motor vehicle having an engine unit mounted for oscillation and an exhaust line attached to said engine unit to oscillate therewith, an arm attached to and supporting said exhaust line, a flexible diaphragm having its edges attached to the vehicle, and means attaching a mid-portion of the diaphragm to the arm.

14. In a motor vehicle having an engine unit mounted therein for oscillation with respect thereto, and an exhaust line rigidly attached to said engine unit, an arm attached to said exhaust line for supporting the exhaust line on the vehicle and for permitting oscillation of the exhaust line with the engine unit, a flexible member, means attaching said flexible member to the vehicle, and means spaced from said attaching means and attaching the arm to a middle portion of the flexible member.

15. In a motor vehicle having a frame, and an engine unit mounted on the vehicle to oscillate with respect to the frame about a longitudinal axis, an exhaust line rigidly connected with the engine unit, and a connection between the exhaust line and the frame extending laterally from the exhaust line at a substantial acute angle to a vertical plane passing longitudinally through the exhaust line and for supporting the exhaust line and permitting oscillation thereof with the engine unit.

ROLLAND S. TROTT.